(12) United States Patent
Ishihara et al.

(10) Patent No.: US 12,742,666 B2
(45) Date of Patent: Sep. 22, 2026

(54) LINEAR ENCODER, GUIDE MECHANISM, AND METHOD FOR ATTACHING LINEAR ENCODER

(71) Applicant: THK CO., LTD., Tokyo (JP)

(72) Inventors: Akira Ishihara, Tokyo (JP); Yukihiro Sugiura, Tokyo (JP)

(73) Assignee: THK CO., LTD., Tokyo (JP)

( * ) Notice: Subject to any disclaimer, the term of this patent is extended or adjusted under 35 U.S.C. 154(b) by 311 days.

(21) Appl. No.: 18/708,046

(22) PCT Filed: Nov. 8, 2022

(86) PCT No.: PCT/JP2022/041495
§ 371 (c)(1),
(2) Date: May 7, 2024

(87) PCT Pub. No.: WO2023/085250
PCT Pub. Date: May 19, 2023

(65) Prior Publication Data

US 2026/0202224 A1 Jul. 16, 2026

(30) Foreign Application Priority Data

Nov. 12, 2021 (JP) ................................ 2021-185060

(51) Int. Cl.
*G01D 5/54* (2006.01)

(52) U.S. Cl.
CPC ..................................... *G01D 5/54* (2013.01)

(58) Field of Classification Search
CPC ............ G01B 7/14; G01D 5/347; G01D 5/54
(Continued)

(56) References Cited

U.S. PATENT DOCUMENTS 5,793,201 A * 8/1998 Nelle ....................... G01B 7/30
324/207.2
6,769,195 B2 * 8/2004 Huber ................. F16C 29/0633
33/708
(Continued)

FOREIGN PATENT DOCUMENTS

CN 102317034 A 1/2012
JP 2012-002578 A 1/2012
(Continued)

OTHER PUBLICATIONS

International Search Report dated Dec. 20, 2022, issued in counterpart International application No. PCT/JP2022/041495, with English translation. (4 pages).

(Continued)

*Primary Examiner* — George B Bennett
(74) *Attorney, Agent, or Firm* — WHDA, LLP

(57) ABSTRACT

To improve workability in a mounting work of a linear encoder, while enhancing detection accuracy of the linear encoder. A base (12) is provided with a linear scale (26) extending in a first direction (D1), and a table (14) is provided with a reading head (34) which is provided to face the linear scale (26) and which reads scale marks of the linear scale (26). A scale mounting surface (12*d*) via which the linear scale (26) is mounted to the base (12) lies in a same plane as a first rail mounting surface (12*a*) via which a guide rail (16L) is mounted to the base (12). The linear scale (26) has a lateral end surface (26*s*) which is in contact with a lateral surface (16*s*) of the guide rail (16L).

6 Claims, 10 Drawing Sheets

(58) Field of Classification Search
USPC .......................................... 33/706, 707, 708
See application file for complete search history.

(56) References Cited

U.S. PATENT DOCUMENTS

| | | | | |
|---|---|---|---|---|
| 7,478,481 | B2 * | 1/2009 | Reynaerts | G01D 5/24438 33/1 M |
| 7,934,324 | B2 * | 5/2011 | Tomiya | G01D 5/34707 33/702 |
| 9,417,045 | B2 * | 8/2016 | Sugamata | G01D 5/34707 |
| 9,506,778 | B2 * | 11/2016 | Tsuji | G01D 5/34746 |
| 9,689,716 | B2 * | 6/2017 | Hayashi | G01D 5/34753 |
| 10,677,614 | B2 * | 6/2020 | Mori | G01D 5/2457 |
| 2011/0271540 | A1 * | 11/2011 | Henshaw | F16C 41/007 33/708 |
| 2012/0025812 | A1 * | 2/2012 | Dolsak | G01D 5/2448 324/207.25 |
| 2016/0084676 | A1 | 3/2016 | Moriyuki et al. | |
| 2016/0363199 | A1 | 12/2016 | Krauer | |
| 2016/0363200 | A1 | 12/2016 | Krauer | |

FOREIGN PATENT DOCUMENTS

| | | | | | |
|---|---|---|---|---|---|
| JP | 2013-72742 | A | | 4/2013 | |
| JP | 2013-130468 | A | | 7/2013 | |
| JP | 2016-36228 | A | | 3/2016 | |
| KR | 20210046463 | A | * | 4/2021 | G01D 5/145 |
| TW | 201502477 | A | | 1/2015 | |
| TW | 201710012 | A | | 3/2017 | |

OTHER PUBLICATIONS

Notification of Transmittal of Translation of the International Preliminary Report on Patentability (Form PCT/IB/338) issued in counterpart International application No. PCT/JP2022/041495 mailed May 23, 2024 with Forms PCT/IB/373 and PCT/ISA/237, with English translation. (8 pages).

Office Action dated Aug. 1, 2025, issued in counterpart TW Application No. 111142888, with English translation.(16 pages).

* cited by examiner 18
12
16 (16R)
D2
18
20 (20R)
14
18
16 (16L)
18
20 (20L)
28
26a
28
10
26
36
24
36
D1
34
18
28

LINEAR ENCODER, GUIDE MECHANISM, AND METHOD FOR ATTACHING LINEAR ENCODER

TECHNICAL FIELD

The present invention relates to a guide mechanism that guides a slider with respect to a base so that the slider is movable in a predetermined direction, a linear encoder for use in the guide mechanism, and a method for mounting the linear encoder.

BACKGROUND ART

The guide mechanism is widely used as a part of any of various devices such as processing devices and article transfer devices. There is a trend toward increasing range of use of the guide mechanism in various fields in future.

A guide mechanism disclosed in Patent Literature 1 includes a linear encoder that detects a position of a slider (referred to as a "table" in Patent Literature 1) in a predetermined direction. The linear encoder includes: a linear scale which is provided in a base (referred to as a "pedestal" in Patent Literature 1) and which extends in a predetermined direction; and a reading head (referred to as an "encoder head" in Patent Literature 1) which is provided to the slider so as to face the linear scale and which reads scale marks on the linear scale.

CITATION LIST

Patent Literature

[Patent Literature 1]
Japanese Patent Application Publication, Tokukai, No. 2020-8397

SUMMARY OF INVENTION

Technical Problem

Incidentally, in order to enhance detection accuracy of the linear encoder, it is necessary to secure sufficient parallelism between the linear scale and the guide rail. Meanwhile, mounting the linear encoder to the base while maintaining sufficient parallelism between the linear scale and the guide rail is not easy, and may cause complication in the mounting work of the linear encoder. That is, it is difficult to improve workability in the mounting work of the linear encoder, while enhancing the detection accuracy of the linear encoder, which is disadvantageous.

In view of this, an aspect of the present invention has an object to improve workability in the mounting work of the linear encoder while enhancing the detection accuracy of the linear encoder.

Solution to Problem

In order to attain the above object, a linear encoder in accordance with an aspect of the present invention is for use in a guide mechanism that includes: a guide rail which is provided to a base and which extends in a predetermined direction; and a guide block which is provided to a slider and which is supported by the guide rail slidably in the predetermined direction, the linear encoder detecting a position of the slider in the predetermined direction, the linear encoder including: a linear scale which is provided to the base, which is disposed in parallel with the guide rail, and which extends in the predetermined direction; and a reading head which is provided to the slider so as to face the linear scale and which reads scale marks of the linear scale. A scale mounting surface via which the linear scale is mounted to the base lies in a same place as a rail mounting surface via which the guide rail is mounted to the base, and the linear scale has a lateral end surface which is in contact with a lateral surface of the guide rail.

In order to attain the above object, a guide mechanism in accordance with an aspect of the present invention is a guide mechanism that guides a slider with respect to a base so that the slider is movable in a predetermined direction, the guide mechanism including: a guide rail which is provided to the base and which extends in the predetermined direction; a guide block which is provided to the slider and which is supported by the guide rail slidably in the predetermined direction; and a linear encoder which detects a position of the slider in the predetermined direction. The linear encoder includes: a linear scale which is provided to the base, which is disposed in parallel with the guide rail, and which extends in the predetermined direction; and a reading head which is provided to the slider so as to face the linear scale and which reads scale marks of the linear scale. A scale mounting surface via which the linear scale is mounted to the base lies in a same place as a rail mounting surface via which the guide rail is mounted to the base, and the linear scale has a lateral end surface which is in direct or indirect contact with a lateral surface of the guide rail.

In order to attain the above object, in a case where the linear encoder includes a head bracket provided to the table and the reading head is provided to the slider via the head bracket, a method in accordance with an aspect of the present invention for mounting a linear encoder includes: a first mounting step of (a) bringing the lateral end surface of the linear scale into direct or indirect contact with the lateral surface of the guide rail and (b), in this state, mounting the linear scale to the scale mounting surface of the base. The method in accordance with the aspect of the present invention for mounting the linear encoder includes: a second mounting step of (a), after mounting the linear scale, bringing a lateral end surface of the head bracket into contact with the head positioning surface of the slider and (b), in this state, mounting the reading head to the head mounting surface of the slider via the head bracket.

Advantageous Effects of Invention

In accordance with an aspect of the present invention, it is possible improve workability in the mounting work of the linear encoder, while enhancing the detection accuracy of the linear encoder.

BRIEF DESCRIPTION OF DRAWINGS

FIG. 5 is a partial cross-sectional view for illustrating a first mounting step in a method in accordance with the present embodiment for mounting a linear encoder.

FIG. 6 is a partial cross-sectional view for illustrating the first mounting step in the method in accordance with the present embodiment for mounting the linear encoder.

FIG. 7 is a partial cross-sectional view for illustrating a second mounting step in the method in accordance with the present embodiment for mounting the linear encoder.

DESCRIPTION OF EMBODIMENTS

The following description will discuss an embodiment of the present invention with reference to the drawings.

[Configuration and the Like of Guide Mechanism 10]

Figure 1:
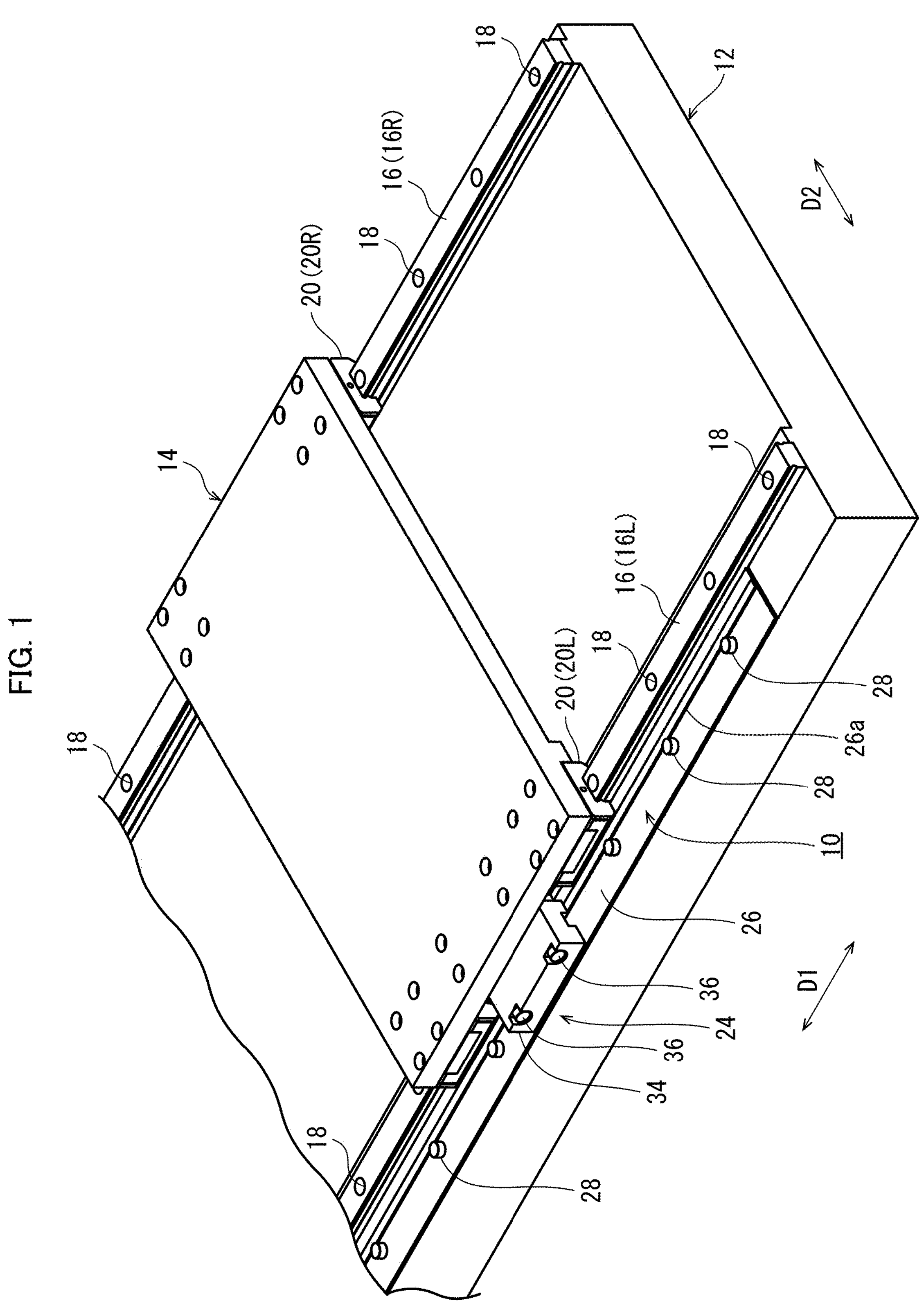
FIG. 1 is a perspective view illustrating a guide mechanism in accordance with the present embodiment.
Figure 2:
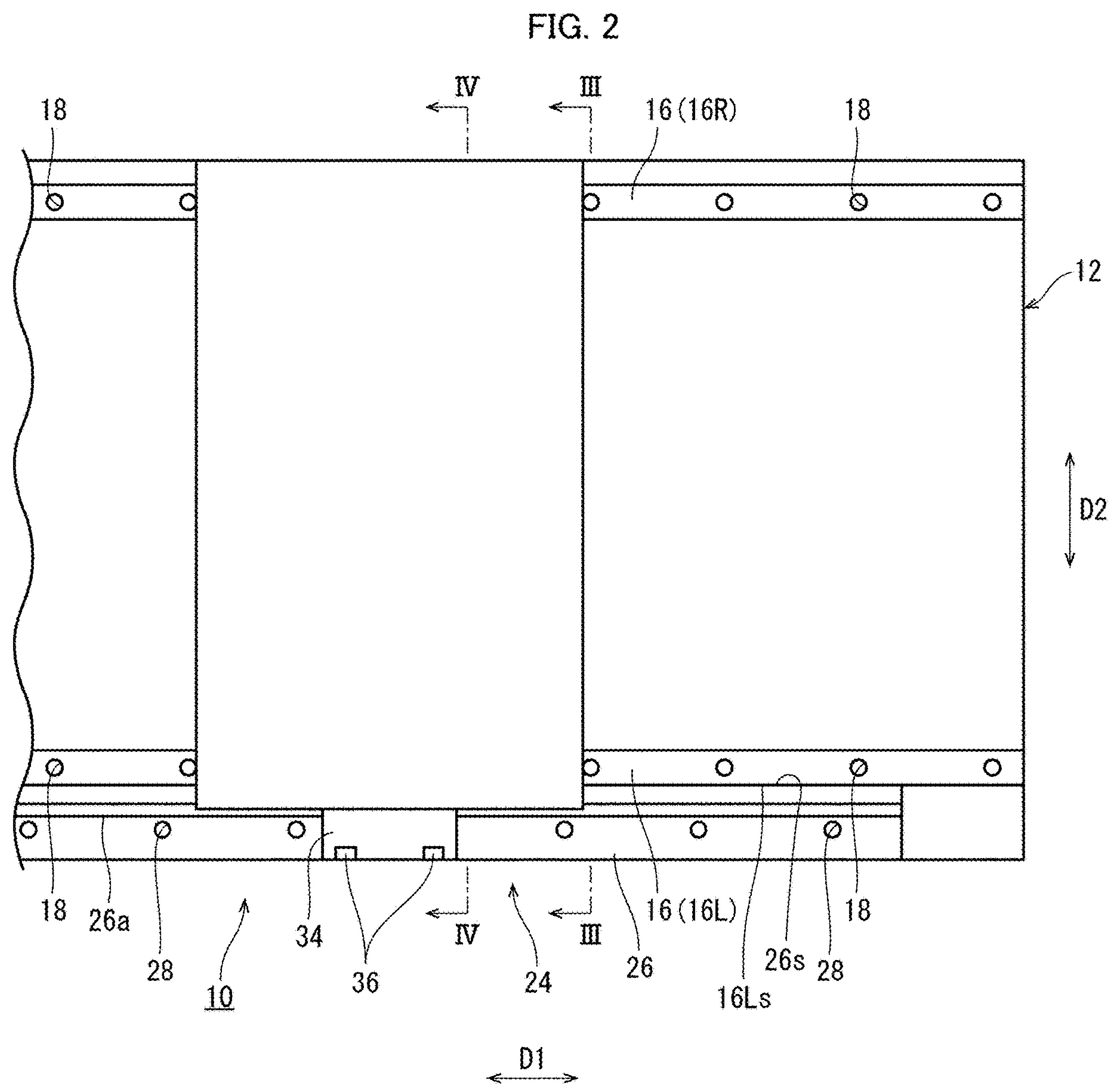
FIG. 2 is a plan view illustrating the guide mechanism in accordance with the present embodiment.
Figure 3:
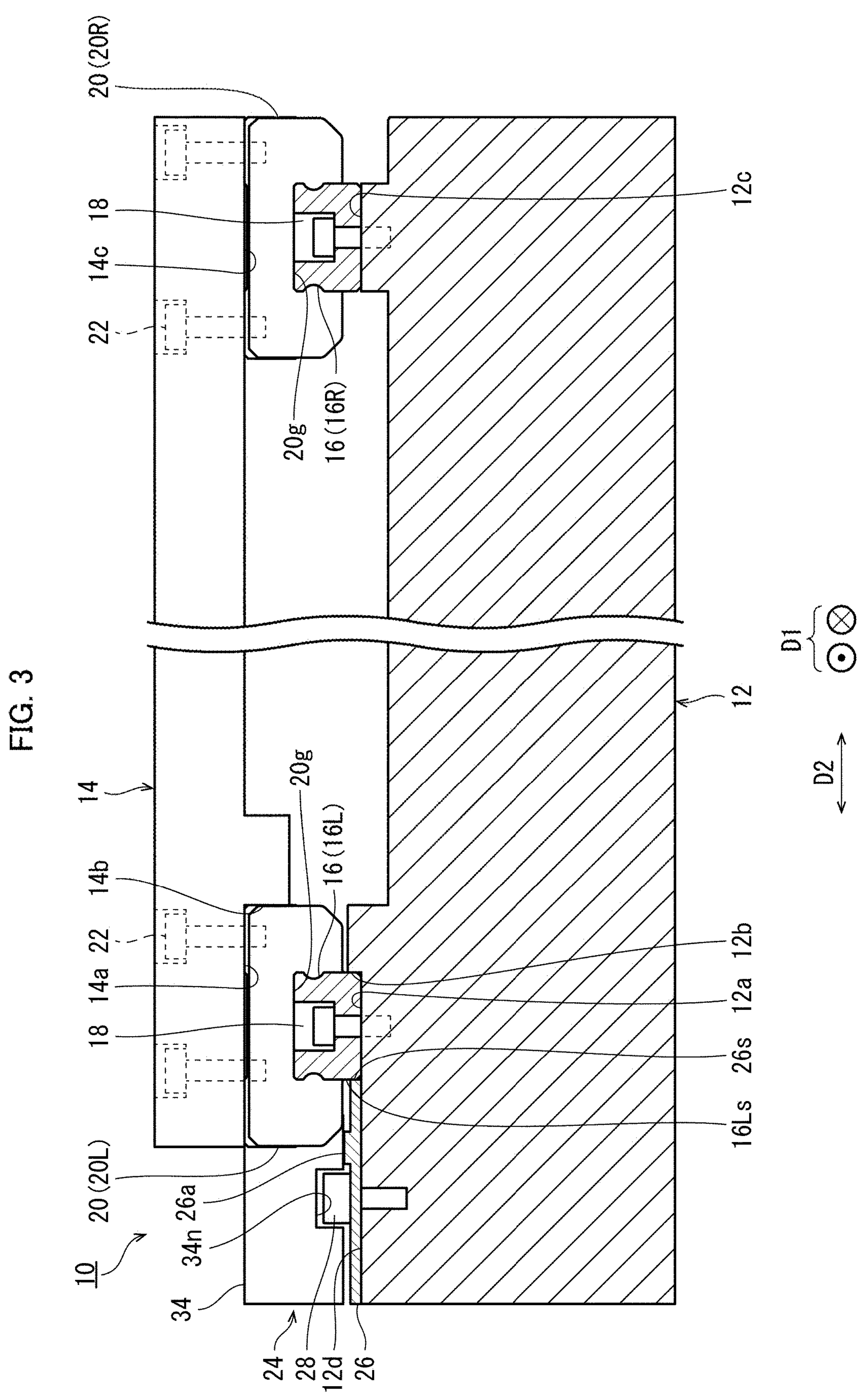
FIG. 3 is an enlarged cross-sectional view taken along the III-III line of FIG. 2.
Figure 4:
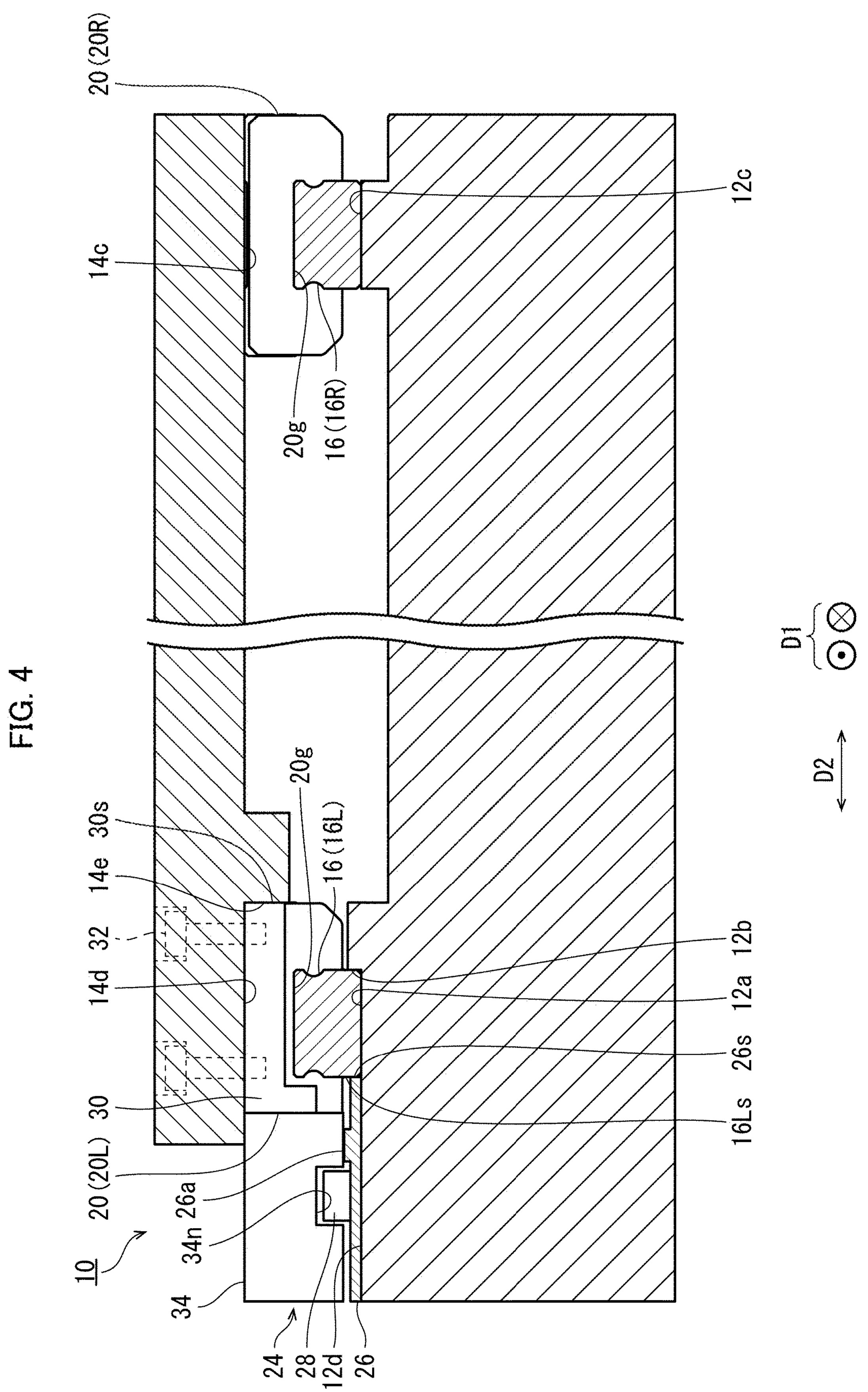
FIG. 4 is an enlarged cross-sectional view taken along the IV-IV line of FIG. 2.

The following description will discuss, with reference to FIGS. 1 to 4, a configuration and the like of a guide mechanism 10 in accordance with the present embodiment. FIG. 1 is a perspective view illustrating a guide mechanism in accordance with the present embodiment. FIG. 2 is a plan view illustrating the guide mechanism in accordance with the present embodiment. FIG. 3 is an enlarged cross-sectional view taken along the III-III line of FIG. 2. FIG. 4 is an enlarged cross-sectional view taken along the IV-IV line of FIG. 2.

As shown in FIGS. 1 and 2, the guide mechanism 10 in accordance with the present embodiment is a mechanism that guides a table 14, serving as a slider, with respect to a base 12 so that the table 14 is movable in a first direction D1, which is a predetermined direction. The base 12 extends along the first direction D1, and the table 14 extends along a second direction D2, which is orthogonal to the predetermined direction. The guide mechanism 10, the base 12, and the table 14 are used as a part of any of various devices such as processing devices (e.g., a laser processing device) and article transfer devices.

(Guide Rail 16)

As shown in FIGS. 1 to 3, guide rails 16 (16L, 16R), which extend in the first direction D1, are respectively provided, via a plurality of hex socket mounting bolts 18, to two sides of a front side of the base 12 which two sides extend in the second direction D2. The two guide rails 16 (16L, 16R) are arranged in parallel with each other. One guide rail 16L is located closer to one end in the second direction D2, whereas the other guide rail 16R is located closer to the other end in the second direction.

(Guide Block 20)

As shown in FIGS. 1 to 3, two guide blocks 20 (20L, 20R) are provided closer to each of two ends in the second direction D2 of a back side of the table 14 via a plurality of hex socket mounting bolts 22. The two guide blocks 20L are located closer to the one end in the second direction D2, whereas the two guide rails 20R are located closer to the other end in the second direction D2. The two guide blocks 20L are spaced from each other in the first direction D1, and are supported by the one guide rail 16L slidably in the first direction D1. The two guide blocks 20R are spaced from each other in the first direction D1, and are supported by the other guide rail 16R slidably in the first direction D1. Each guide block 20 (20L, 20R) has a guide groove 20*g* that fits a corresponding one of the guide rails 16 (16L, 16R) slidably in the first direction D1.

(Configuration Relating to Mounting of Guide Rail 16)

As shown in FIG. 3, a first rail mounting surface 12*a* which is flat and via which the guide rail 16L is mounted is formed, by machine processing, in a portion of the front side of the base 12 which portion is closer to the one end in the second direction D2. The first rail mounting surface 12*a* of the base 12 extends, along the first direction D1, from one end to the other end of the base 12 in a longitudinal direction (the first direction D1) of the base 12. A rail positioning surface 12*b* via which the one guide rail 16L is positioned in the second direction D2 is formed, by machine processing, in a portion of the front side of the base 12 which portion is closer to the one end in the second direction D2. The rail positioning surface 12*b* of the base 12 is orthogonal to the first rail mounting surface 12*a*, and extends, along the first direction D1, from the one end to the other end of the base 12 in the longitudinal direction of the base 12.

A second rail mounting surface 12*c* which is flat and via which the other guide rail 16R is mounted is formed, by machine processing, in a portion of the front side of the base 12 which portion is closer to the other end in the second direction D2. The second rail mounting surface 12*c* of the base 12 extends, along the first direction D1, from the one end to the other end of the base 12 in the longitudinal direction of the base 12. The second rail mounting surface 12*c* lies in the same plane as the first rail mounting surface 12*a*.

(Configuration Relating to Mounting of Guide Block 20)

As shown in FIG. 3, two first block mounting surfaces 14*a* which are flat and via which the guide blocks 20L are mounted are formed, by machine processing, in a portion of the back side of the table 14 which portion is closer to the one end in the second direction D2. The two first block mounting surfaces 14*a* (only one of which is illustrated) of the table 14 are spaced from each other in the first direction D1. Two block positioning surfaces 14*b* via which the guide blocks 20L are positioned in the second direction D2 are formed, by machine processing, in a portion of the back side of the table 14 which portion is closer to the one end in the second direction D2. The two block positioning surfaces 14*b* (only one of which is illustrated) of the table 14 are spaced from each other in the first direction D1. The block positioning surfaces 14*b* of the table 14 are orthogonal to the first block mounting surfaces 14*a*.

Second block mounting surfaces 14*c* which are flat and via which the guide blocks 20R are mounted is formed, by machine processing, in a portion of the back side of the table 14 which portion is closer to the other end in the second direction D2. The two second block mounting surfaces 14*c* (only one of which is illustrated) of the table 14 are spaced from each other in the first direction D1. The second block mounting surfaces 14*c* of the table 14 lie in the same plane as the first block mounting surfaces 14*a*.

(Overview of Linear Encoder 24)

As shown in FIGS. 1 and 2, the guide mechanism 10 includes the linear encoder 24 that detects a position (movement amount) of the table 14 in the first direction D1. The linear encoder 24 may employ any one of an optical detection method, a magnetic detection method, an electrostatic detection method, and an electromagnetic detection method. A specific configuration of the linear encoder 24 is as described below.

(Linear Scale 26)

As shown in FIGS. 1, 2, and 4, a linear scale 26 which is in the form of a long plate and which extends in the first direction D1 is provided, via a plurality of hex socket mounting bolts 28, in a portion of the front side of the base 12 which portion is closer to the one end in the second direction D2. The linear scale 26 is disposed in parallel with the one guide rail 16L, and is located closer to the one end in the second direction than the one guide rail 16L is. The linear scale 26 has, on its surface, a scale mark portion 26*a* extending in the first direction D1. The scale mark portion 26*a* has scale marks (not illustrated) provided so as to extend in the first direction D1. In order to enhance the detection accuracy of the linear encoder 24, it is necessary to secure sufficient parallelism between the linear scale 26 and the one guide rail 16L. Note that the linear scale 26 may be formed in the form of a tape, instead of in the form of a long plate.

(Head Bracket 30, Reading Head 34)

As shown in FIGS. 1, 2, and 4, a head bracket 30 is provided, via a plurality of hex socket mounting bolts 32, in a portion of the back side of the table 14 which portion is closer to the one end in the second direction D2. The head bracket 30 is disposed between the two guide blocks 20L, and faces the one guide rail 16L. When seen from the front, the head bracket 30 has an L-shape.

The head bracket 30 has a lateral end to which a reading head 34 is connected via a plurality of hex socket connecting bolts 36. The reading head 34 reads the scale marks of the scale mark portion 26*a* of the linear scale 26, and is provided so as to face the linear scale 26. In other words, in the portion of the back side of the table 14 which portion is closer to the one end in the second direction, the reading head 34 is provided via the head bracket 30 and the like so as to face the linear scale 26. The reading head 34 and the head bracket 30 are disposed between the two guide blocks 20L. The head bracket 30 is configured to be attachable and detachable with respect to the reading head 34. The reading head 34 has a notch 34*n* for avoiding interference with the heads of the mounting bolts 28. In order to enhance the detection accuracy of the linear encoder 24, it is necessary to set a gap between the reading head 34 and the scale mark portion 26*a* of the linear scale 26 so as to fall within a predetermined amount (predetermined range).

(Configuration and the Like Relating to Mounting of Linear Encoder 24)

As shown in FIGS. 3 and 4, a scale mounting surface 12*d* which is flat and via which the linear scale 26 is mounted is formed, by machine processing, in a portion of the front side of the base 12 which portion is closer to the one end in the second direction D2. The scale mounting surface 12*d* extends, along the first direction D1, from a location close to one end in a longitudinal direction (first direction D1) of the base 12 to a location close to the other end in the longitudinal direction of the base 12. The scale mounting surface 12*d* of the base 12 is a surface continuous with the first rail mounting surface 12*a*, and lies in the same plane as the first rail mounting surface 12*a*. A lateral end surface 26*s* in a shorter side direction of the linear scale 26 is in contact with a lateral surface 16Ls in a shorter side direction of the one guide rail 16L. In other words, a scale positioning surface via which the linear scale 26 is positioned in the first direction D1 is the lateral surface 16Ls in the shorter side direction of the one guide rail 16L.

A head mounting surface 14*d* which is flat and via which the reading head 34 is mounted via the head bracket 30 is formed, by machine processing, in a portion of the back side of the table 14 which portion is closer to the one end in the second direction D2. The head mounting surface 14*d* of the table 14 is a surface continuous with the two block mounting surfaces 14*a*, and lies in the same plane as the two block mounting surfaces 14*a*. A head positioning surface 14*e* via which the reading head 34 is positioned in the second direction D2 via the head bracket 30 is formed, by machine processing, in a portion of the back side of the table 14 which portion is closer to the one end in the second direction D2. The head positioning surface 14*e* of the table 14 is orthogonal to the head mounting surface 14*d*. The head positioning surface 14*e* is a surface continuous with the two block positioning 14*b*, and lies in the same plane as the two block mounting surfaces 14*b*.

(Driving Mechanism)

A driving mechanism (not illustrated), which causes the table 14 to move in the first direction D1, is provided between the base 12 and the table 14. The driving mechanism is driven under control of a control device made of a computer, on the basis of a detection result from the linear encoder 24. In other words, the moving operation of the table 14 is driven under control of the control device on the basis of a detection result from the linear encoder 24.

In a case where the driving mechanism is made of a linear motor, the driving mechanism includes: a stator which is provided on the front side of the base 12; and a mover which is provided on the back side of the table 14 and which faces the stator. In a case where the driving mechanism includes a servomotor provided to the base 12, the driving mechanism includes: a ball screw which is rotatably provided to the front side of the base 12 and which is interlocked and coupled to an output shaft of the servomotor; and a nut member which is provided to the back side of the table 14 and which is screwed into the ball screw. In a case where the driving mechanism includes a servomotor provided to the table 14, the driving mechanism includes: a rack member which is provided to the front side of the base 12; and a pinion member which is interlocked and coupled to an output shaft of the servomotor and which engages the rack member. Note that the driving mechanism may be a hydraulic cylinder or an electric cylinder.

[Method for Mounting Linear Encoder]

Figure 5:
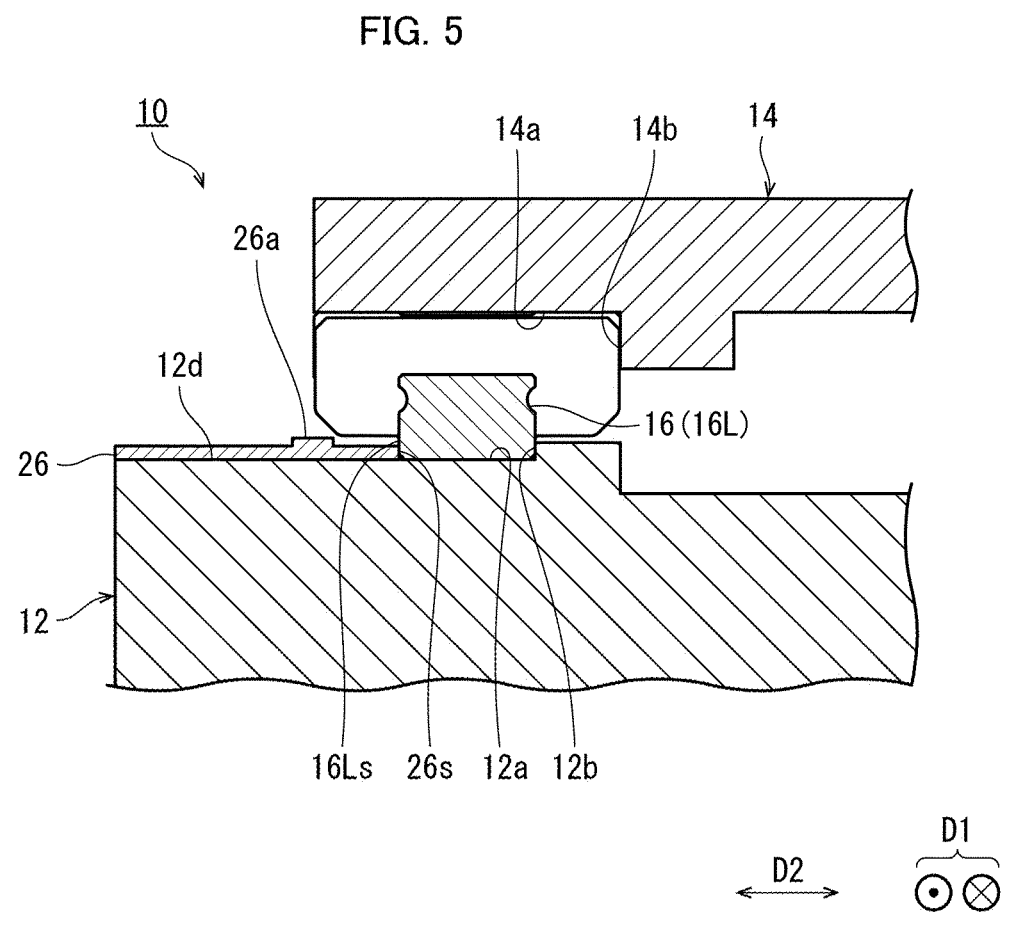
Figure 6:
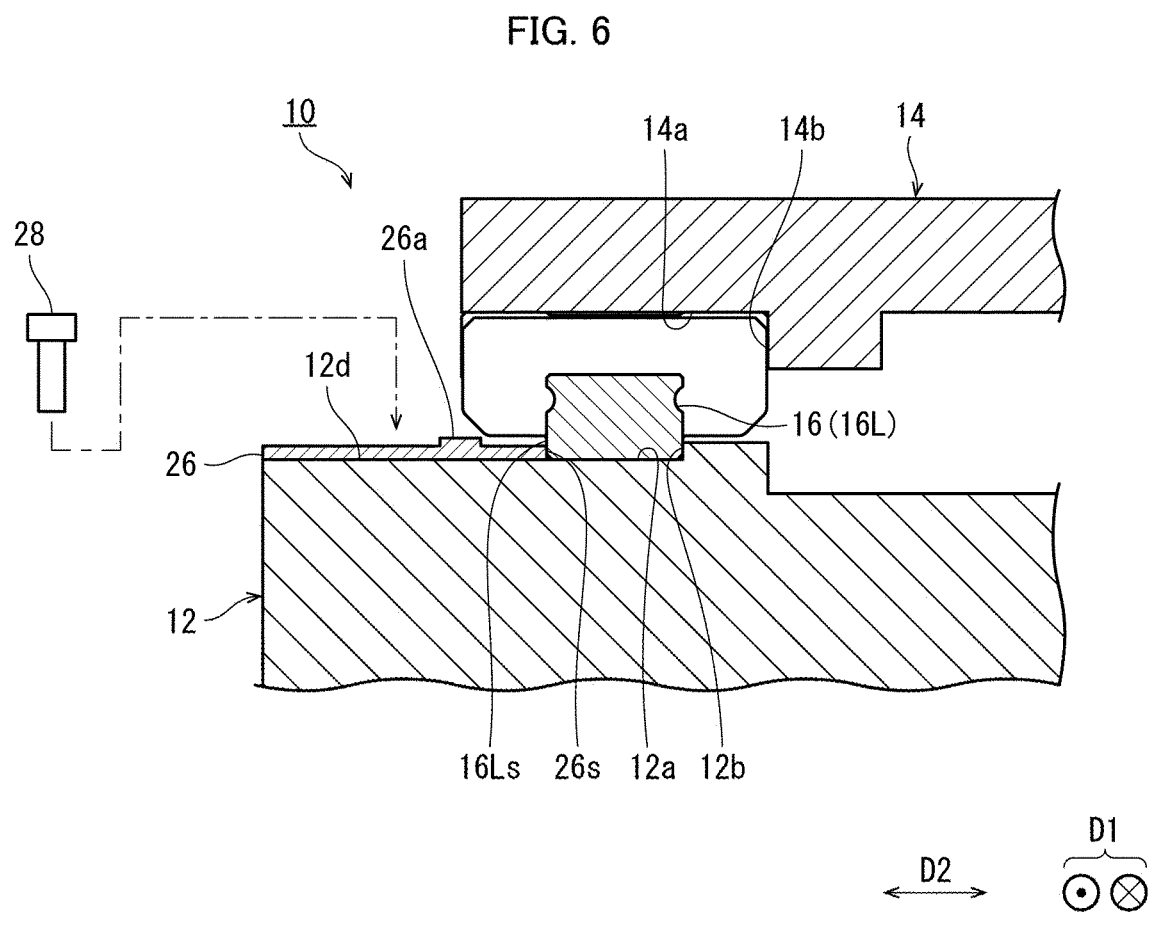
Figure 7:
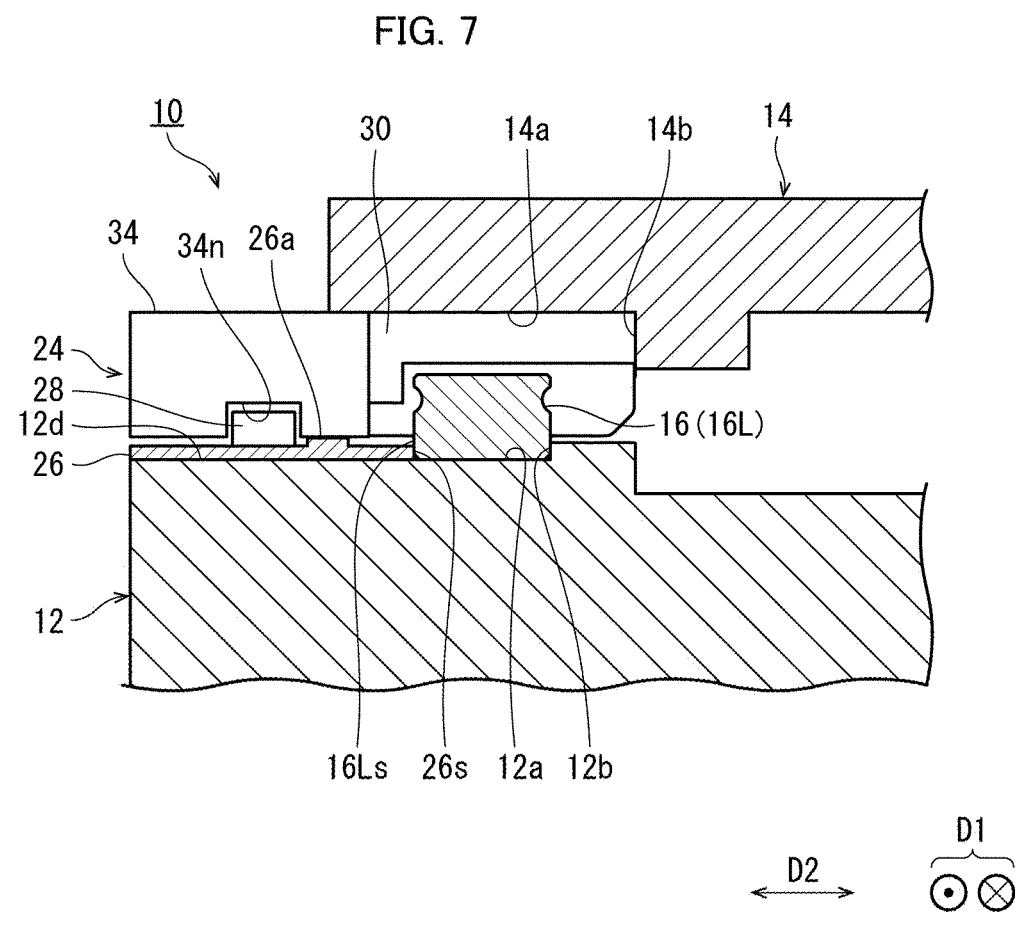
Figure 8:
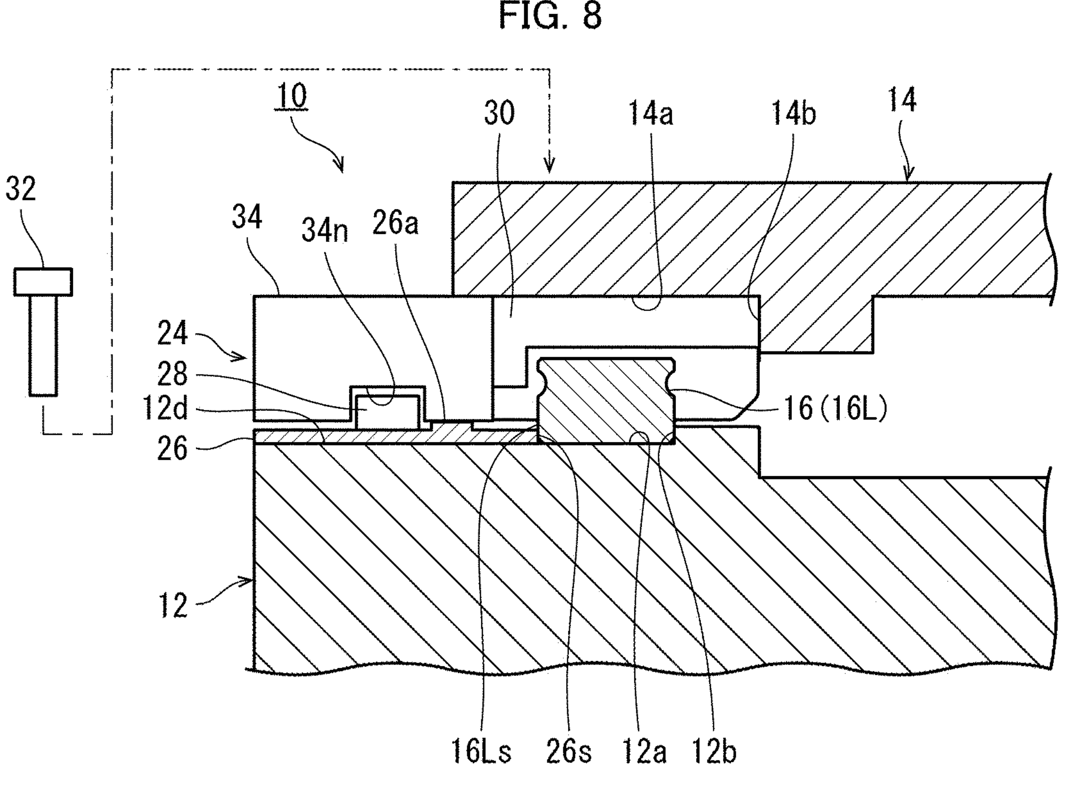
FIG. 8 is a partial cross-sectional view for illustrating the second mounting step in the method in accordance with the present embodiment for mounting the linear encoder.

Next, the following description will discuss, with reference to FIGS. 5 to 8, a method in accordance with the present embodiment for mounting a linear encoder. Each of FIGS. 5 and 6 is a partial cross-sectional view for illustrating a first mounting step in the method in accordance with the present embodiment for mounting the linear encoder. Each of FIGS. 7 and 8 is a partial cross-sectional view for illustrating a second mounting step in the method in accordance with the present embodiment for mounting the linear encoder.

The method in accordance with the present embodiment for mounting the linear encoder is a method for mounting the linear encoder 24 at a location between the base 12 and the table 14, and includes the first mounting step and the second mounting step. Details of the first mounting step and the second mounting step in the method in accordance with the present embodiment for mounting the linear encoder are as described below.

(First Mounting Step)

As shown in FIG. 5, after mounting the guide rails 16 (16L, 16R) and the guide blocks 20 (20L, 20R), a work person first brings the lateral end surface 26*s* in the shorter side direction of the linear scale 26 into contact with the lateral surface 16Ls in the shorter side direction of the one guide rail 16L. Consequently, the linear scale 26 is positioned at a predetermined position in the second direction D2 relative to the base 12. Then, in this state, the work person uses the hex socket mounting bolts 28 to mount the linear scale 26 to the scale mounting surface 12*d* of the base 12, as shown in FIG. 6.

(Second Mounting Step)

As shown in FIG. 7, after mounting the linear scale 26, the work person brings the lateral end surface 30*s* of the head bracket 30 into contact with the head positioning surface 14*e* of the table 14. Consequently, the reading head 34 is positioned at a predetermined position in the second direction D2 relative to the table 14. Then, in this state, the work person uses the hex socket mounting bolts 32 to mount the reading head 34 to the head mounting surface 14*d* of the table 14 via the head bracket 30.

Actions and Effects of the Present Embodiment

Next, the following will describe actions and effects of the present embodiment.

According to the configuration of the present embodiment, the scale mounting surface 12*d* via which the linear scale 26 is mounted to the front side of the base 12 lies in the same plane as the rail mounting surface 12*a* via which the one guide rail 16L is mounted to the front side of the base 12. The lateral end surface 26*s* in the shorter side direction of the linear scale 26 is in contact with the lateral surface 16Ls in the shorter side direction of the one guide rail 16L. Thus, merely by mounting the linear scale 26 to the scale mounting surface 12*d* of the base 12 in a state where the lateral end surface 26*s* in the shorter side direction of the linear scale 26 is in contact with the lateral surface 16Ls in the shorter side direction of the one guide rail 16L, it is possible to secure sufficient parallelism between the linear scale 26 and the one guide rail 16L. This facilitates the work of mounting the linear scale 26 to the base 12, while enhancing the detection accuracy of the linear encoder 24.

Further, according to the configuration of the present embodiment, the head mounting surface 14*d* via which the reading head 34 is mounted to the back side of the table 14 via the head bracket 30 lies in the same plane as the block mounting surfaces 14*a* via which the guide blocks 20L is mounted to the back side of the table 14. The head positioning surface 14*e* via which the reading head 34 is positioned relative to the table 14 in the second direction D2 lies in the same plane as the block positioning surfaces 14*b* via which the guide blocks 20L are positioned relative to the table 14 in the second direction D2. Thus, merely by bringing the lateral end surface 30*s* of the head bracket 30 into contact with the head positioning surface 14*e* of the table 14 and mounting the reading head 34 to the head mounting surface 14*d* of the table 14 via the head bracket 30, it is possible to set a gap between the reading head 34 and the linear scale 26 so as to fall within a predetermined amount (predetermined range). This saves the time and effort taken to adjust a gap between the reading head 34 and the scale mark portion 26*a* of the linear scale 26 so as to fall within a predetermined amount, while enhancing the detection accuracy of the linear encoder 24. This facilitates the work of mounting the reading head 34 to the table 14.

That is, according to the present embodiment, it is possible to improve workability in the mounting work of the linear encoder 24, while enhancing the detection accuracy of the linear encoder 24.

According to the configuration of the present embodiment, the scale mounting surface 12*d* of the base 12 is a surface continuous with the first rail mounting surface 12*a*, and lies in the same plane as the first rail mounting surface 12*a*. Thus, the scale mounting surface 12*d* and the first rail mounting surface 12*a* of the base 12 can be formed by the same machine processing. Similarly, the head mounting surface 14*d* of the table 14 is a surface continuous with the two block mounting surfaces 14*a*, and lies in the same plane as the two block mounting surfaces 14*a* of the table 14. Thus, the head mounting surface 14*d* and the two block mounting surfaces 14*a* of the table 14 can be formed by the same machine processing. Further, the head positioning surface 14*e* of the table 14 is a surface continuous with the two block positioning 14*b*, and lies in the same plane as the two block mounting surfaces 14*b*. Thus, the head positioning surface 14*e* and the two block positioning surfaces 14*b* of the table 14 can be formed by the same machine processing.

That is, according to the present embodiment, it is possible to significantly reduce the time, effort, and cost taken to process the scale mounting surface 12*d* of the base 12 and the head mounting surface 14*d* and the head positioning surface 14*e* of the table 14. In other words, according to the present embodiment, it is possible to significantly reduce the time, effort, and cost taken to mount the linear encoder 24 at a location between the base 12 and the table 14.

Furthermore, according to the configuration of the present embodiment, the head bracket 30 is configured to be attachable and detachable with respect to the reading head 34. Thus, according to the present embodiment, it is possible to enhance versatility of the linear encoder 24 by preparing a plurality of kinds of head brackets 30 for various types (e.g., models) of guide rails 16.

Further, according to the present embodiment, the reading head 34 and the head bracket 30 are disposed between the two guide blocks 20L. Thus, according to the present embodiment, it is possible to mount the reading head 34 to the table 14 via the head bracket 30 and to make the table 14 compact, even without increasing the size of the table 14 in the first direction D1.

[First Variation]

Figure 9:
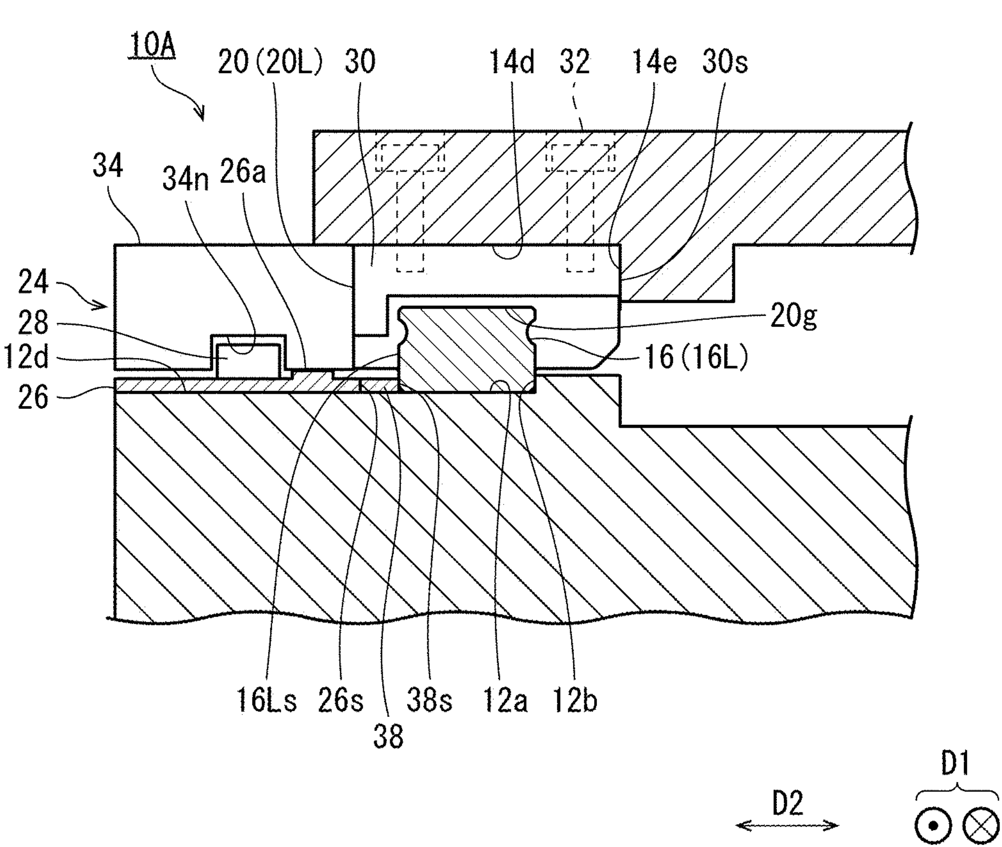
FIG. 9 is an enlarged cross-sectional view for illustrating a guide mechanism in accordance with a first variation of the present embodiment.

The following description discuss, with reference to FIG. 9, a configuration and the like of a guide mechanism 10A in accordance with a first variation of the present embodiment. Note that, for convenience, members having identical functions to those of the present embodiment are given identical reference signs, and their descriptions will be omitted.

As shown in FIG. 9, the guide mechanism 10A in accordance with the first variation of the present embodiment is a mechanism that guides a table 14, serving as a slider, with respect to a base 12 so that the table 14 is movable in a first direction D1, which is a predetermined direction. The guide mechanism 10A has a similar configuration to that of the above-described guide mechanism 10 (see FIGS. 1 and 4). The following description will discuss only a difference between the configuration of the guide mechanism 10A and the configuration of the guide mechanism 10.

The base 12 has a first rail mounting surface 12*a* provided with an intervening member 38 extending in the first direction D1. The intervening member 38 is interposed between one guide rail 16L and a linear scale 26. The intervening member 38 is made of a block or a bar. A lateral end surface 38*s* in a shorter side direction of the intervening member 38 is in contact with a lateral surface 16Ls in a shorter side direction of the one guide rail 16L. Further, a lateral end surface 26*s* in a shorter side direction of the linear scale 26 is in indirect contact with the lateral surface 16Ls in the shorter side direction of the one guide rail 16L via the intervening member 38.

The first variation of the present embodiment also provides actions and effects similar to those of the present embodiment described above.

[Second Variation]

Figure 10:
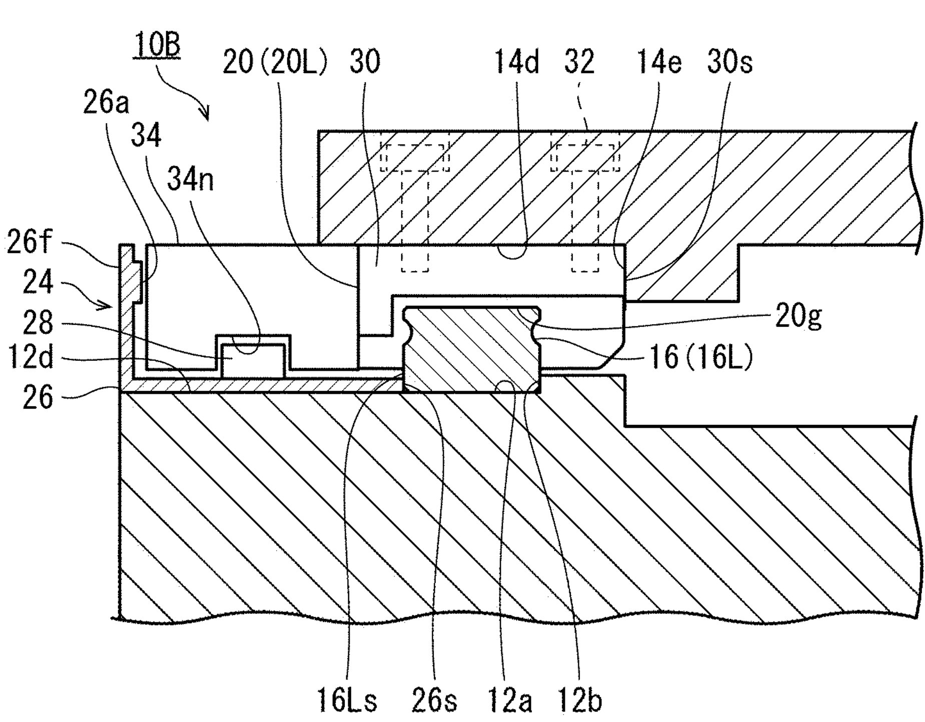
FIG. 10 is an enlarged cross-sectional view for illustrating a guide mechanism in accordance with a second variation of the present embodiment.
Figure 10:

The following description discuss, with reference to FIG. 10, a configuration and the like of a guide mechanism 10B in accordance with a second variation of the present embodiment. Note that, for convenience, members having identical functions to those of the present embodiment are given identical reference signs, and their descriptions will be omitted.

As shown in FIG. 10, the guide mechanism 10B in accordance with the second variation of the present embodiment is a mechanism that guides a table 14, serving as a slider, with respect to a base 12 so that the table 14 is movable in a first direction D1, which is a predetermined direction. The guide mechanism 10B has a similar configuration to that of the above-described guide mechanism 10 (see FIGS. 1 and 4). The following description will discuss only a difference between the configuration of the guide mechanism 10B and the configuration of the guide mechanism 10.

A linear scale 26 has a flange portion **26*f* provided at a location opposite to a lateral end surface 26*s* in a shorter side direction of the linear scale 26. The flange portion 26*f* extends in the first direction D1, and is provided in a standing manner. In other words, the linear scale 26 has a cross section having an L-shape. A scale mark portion 26*a* of the linear scale 26 is provided in the flange portion 26*f*. Consequently, a foreign matter(s) such as dust is hardly accumulated in the scale mark portion 26*a* of the linear scale 26. This can enhance the detection accuracy of the linear encoder 24** in a stable manner.

The second variation of the present embodiment also provides actions and effects similar to those of the present embodiment described above.

Aspects of the present invention can also be expressed as follows:

A linear encoder in accordance with a first aspect of the present invention is for use in a guide mechanism that includes: a guide rail which is provided to a base and which extends in a predetermined direction; and a guide block which is provided to a slider and which is supported by the guide rail slidably in the predetermined direction, the linear encoder detecting a position of the slider in the predetermined direction, the linear encoder including: a linear scale which is provided to the base, which is disposed in parallel with the guide rail, and which extends in the predetermined direction; and a reading head which is provided to the slider so as to face the linear scale and which reads scale marks of the linear scale, a scale mounting surface via which the linear scale is mounted to the base lying in a same place as a rail mounting surface via which the guide rail is mounted to the base, and the linear scale having a lateral end surface which is in contact with a lateral surface of the guide rail. Here, the "contact with the lateral surface of the guide rail" is intended to include "indirect contact with the lateral surface of the guide rail via an intervening member".

According to the above configuration, merely by mounting the linear scale to the scale mounting surface of the base in a state where the lateral end surface of the linear scale is in contact with the lateral surface of the guide rail, it is possible to secure sufficient parallelism between the linear scale and the guide rail. This facilitates the work of mounting the linear scale to the base, while enhancing the detection accuracy of the linear encoder. Consequently, it is possible to improve workability in the mounting work of the linear encoder.

A linear encoder in accordance with a second aspect of the present invention may be configured, in the first aspect, such that: a head mounting surface via which the reading head is mounted to the slider lies in a same place as a block mounting surface via which the guide block is mounted to the slider; and a head positioning surface via which the reading head is positioned relative to the slider in a direction orthogonal to the predetermined direction lies in a same plane as a block positioning surface via which the guide block is positioned relative to the slider in the direction orthogonal to the predetermined direction.

According to the above configuration, merely by positioning the reading head in the orthogonal direction with respect to the head positioning surface of the slider and mounting the reading head to the head mounting surface of the slider, it is possible to easily set a gap between the reading head and the linear scale so as to fall within a predetermined amount. This can save the time and effort taken to adjust a gap between the reading head and the linear scale so as to fall within a predetermined amount, thereby facilitating the work of mounting the reading head to the slider. Consequently, it is possible to further improve workability in the mounting work of the linear encoder.

A linear encoder in accordance with a third aspect of the present invention may be configured, in the first or second aspect, so as to further include: a head bracket which is provided to the reading head and to which the slider is connected, wherein the reading head is provided to the slider via the head bracket.

According to the above configuration, merely by bringing the lateral end surface (lateral surface) of the head bracket into contact with the head positioning surface of the slider and mounting the reading head to the head mounting surface of the slider, it is possible to set a gap between the reading head and the linear scale so as to fall within a predetermined amount. This can save the time and effort taken to adjust a gap between the reading head and the linear scale so as to fall within a predetermined amount, thereby facilitating mounting of the reading head to the slider. Consequently, it is possible to further improve workability in the mounting work of the linear encoder.

Particularly, in a case where the head bracket is configured to be attachable and detachable with respect to the reading head, it is possible to enhance versatility of the linear encoder by preparing a plurality of kinds of head brackets for various types (e.g., models) of guide rails.

A guide mechanism in accordance with a fourth aspect of the present invention is a guide mechanism that guides a slider with respect to a base so that the slider is movable in a predetermined direction, the guide mechanism comprising: a guide rail which is provided to the base and which extends in the predetermined direction; a guide block which is provided to the slider and which is supported by the guide rail slidably in the predetermined direction; and a linear encoder which detects a position of the slider in the predetermined direction, the linear encoder including: a linear scale which is provided to the base, which is disposed in parallel with the guide rail, and which extends in the predetermined direction; and a reading head which is provided to the slider so as to face the linear scale and which reads scale marks of the linear scale, a scale mounting surface via which the linear scale is mounted to the base lying in a same place as a rail mounting surface via which the guide rail is mounted to the base, and the linear scale having a lateral end surface which is in contact with a lateral surface of the guide rail. Here, the "contact with the lateral surface of the guide rail" is intended to include "indirect contact with the lateral surface of the guide rail via an intervening member".

According to the above configuration, merely by mounting the linear scale to the scale mounting surface of the base in a state where the lateral end surface of the linear scale is in contact with the lateral surface of the guide rail, it is possible to secure sufficient parallelism between the guide rail and the linear scale. This facilitates the work of mounting the linear scale to the base, while enhancing the detection accuracy of the linear encoder. Consequently, it is possible to improve workability in the mounting work of the linear encoder.

A method in accordance with a fifth aspect of the present invention for mounting a linear encoder is a method for mounting a linear encoder recited in claim 3, the method including: a first mounting step of (a) bringing the lateral end surface of the linear scale into contact with the lateral surface of the guide rail and (b), in this state, mounting the linear scale to the scale mounting surface of the base; and a second mounting step of (a), after mounting the linear scale, bringing a lateral end surface of the head bracket into contact with the head positioning surface of the slider and (b), in this state, mounting the reading head to the head mounting surface of the slider via the head bracket. Here, the "contact with the lateral surface of the guide rail" is intended to include "indirect contact with the lateral surface of the guide rail via an intervening member".

According to the above configuration, merely by mounting the linear scale to the scale mounting surface of the base in a state where the lateral end surface of the linear scale is in contact with the lateral surface of the guide rail, it is possible to secure sufficient parallelism between the guide rail and the linear scale. This facilitates the work of mounting the linear scale to the base, while enhancing the detection accuracy of the linear encoder. Consequently, it is possible to improve workability in the mounting work of the linear encoder.

Merely by bringing the lateral end surface of the head bracket into contact with the head positioning surface of the slider and mounting the reading head to the head mounting surface of the slider, it is possible to set a gap between the reading head and the linear scale so as to fall within a predetermined amount. This can save the time and effort taken to adjust a gap between the reading head and the linear scale so as to fall within a predetermined amount, thereby facilitating the work of mounting the reading head to the slider. Consequently, it is possible to further improve workability in the mounting work of the linear encoder.

[Additional Remarks]

The present invention is not limited to the foregoing embodiment, but may be altered in various ways by a skilled person within the scope of the claims.

CROSS-REFERENCE OF RELATED APPLICATIONS

This application claims priority on Japanese Patent Application, Tokugan, No. 2021-185060 filed in Japan on Nov. 12, 2021, the entire contents of which are hereby incorporated by reference.

REFERENCE SIGNS LIST

10: guide mechanism
12: base
12*a*: first rail mounting surface
12*b*: rail positioning surface
12*c*: second rail mounting surface
12*d*: scale mounting surface
12*e*: scale positioning surface
14: table (slider)
14*a*: first block mounting surface
14*b*: block positioning surface
14*c*: second block mounting surface
14*d*: head mounting surface
14*e*: head positioning surface
16 (16L, 16R): guide rail
16Ls: lateral surface
18: mounting bolt
20 (20L, 20R): guide block
20*g*: guide groove
22: mounting bolt
24: linear encoder
26: linear scale
26*a*: scale mark portion
26*s*: lateral end surface
28: mounting bolt
30: head bracket
32: mounting bolt
34: reading head
34*n*: notch
36: connecting bolt
38: intervening member
38*s*: lateral end surface
D1: first direction (predetermined direction)
D2: second direction (direction orthogonal to predetermined direction)

The invention claimed is:

1. A linear encoder for use in a guide mechanism that includes: a guide rail which is provided to a base and which extends in a predetermined direction; and a guide block which is provided to a slider and which is supported by the guide rail slidably in the predetermined direction, the linear encoder detecting a position of the slider in the predetermined direction, the linear encoder comprising:

a linear scale which is provided to the base, which is disposed in parallel with the guide rail, and which extends in the predetermined direction; and a reading head which is provided to the slider so as to face the linear scale and which reads scale marks of the linear scale, a scale mounting surface via which the linear scale is mounted to the base lying in a same place as a rail mounting surface via which the guide rail is mounted to the base, and the linear scale having a lateral end surface which is in contact with a lateral surface of the guide rail.

2. The linear encoder according to claim 1, wherein:

a head mounting surface via which the reading head is mounted to the slider lies in a same place as a block mounting surface via which the guide block is mounted to the slider; and a head positioning surface via which the reading head is positioned relative to the slider in a direction orthogonal to the predetermined direction lies in a same plane as a block positioning surface via which the guide block is positioned relative to the slider in the direction orthogonal to the predetermined direction.

3. The linear encoder according to claim 2, further comprising:

a head bracket which is provided to the reading head and to which the slider is connected, wherein the reading head is provided to the slider via the head bracket.

4. A guide mechanism that guides a slider with respect to a base so that the slider is movable in a predetermined direction, the guide mechanism comprising:

a guide rail which is provided to the base and which extends in the predetermined direction;

a guide block which is provided to the slider and which is supported by the guide rail slidably in the predetermined direction; and a linear encoder which detects a position of the slider in the predetermined direction, the linear encoder including:

a linear scale which is provided to the base, which is disposed in parallel with the guide rail, and which extends in the predetermined direction; and a reading head which is provided to the slider so as to face the linear scale and which reads scale marks of the linear scale, a scale mounting surface via which the linear scale is mounted to the base lying in a same place as a rail mounting surface via which the guide rail is mounted to the base, and the linear scale having a lateral end surface which is in direct or indirect contact with a lateral surface of the guide rail.

5. A method for mounting a linear encoder recited in claim 3, comprising:

a first mounting step of (a) bringing the lateral end surface of the linear scale into direct or indirect contact with the lateral surface of the guide rail and (b), in this state, mounting the linear scale to the scale mounting surface of the base; and a second mounting step of (a), after mounting the linear scale, bringing a lateral end surface of the head bracket into contact with the head positioning surface of the slider and (b), in this state, mounting the reading head to the head mounting surface of the slider via the head bracket.

6. The linear encoder according to claim 1, wherein:

the linear scale is mounted to the base such that the lateral end surface of the linear scale is in indirect contact with the lateral surface of the guide rail via an intervening member.

* * * * *